(12) United States Patent
Lysne (10) Patent No.: US 7,724,674 B2
(45) Date of Patent: May 25, 2010

(54) DEADLOCK FREE NETWORK ROUTING

(75) Inventor: Olav Lysne, Bekkestua (NO)

(73) Assignee: Simula Innovations AS, Lysaker (NO)

( * ) Notice: Subject to any disclaimer, the term of this patent is extended or adjusted under 35 U.S.C. 154(b) by 352 days.

(21) Appl. No.: 11/798,698

(22) Filed: May 16, 2007

(65) Prior Publication Data

US 2008/0285458 A1    Nov. 20, 2008

(51) Int. Cl.
*H04L 12/28* (2006.01)
(52) U.S. Cl. .................. 370/238; 370/254; 370/351; 709/241
(58) Field of Classification Search ......... 370/254–256, 370/351, 352, 389, 392, 400, 408

See application file for complete search history.

(56) References Cited

U.S. PATENT DOCUMENTS

| | | | |
|---|---|---|---|
| 2003/0086425 A1* | 5/2003 | Bearden et al. | 370/392 |
| 2006/0268834 A1* | 11/2006 | Bajic | 370/352 |
| 2007/0058607 A1* | 3/2007 | Mack-Crane et al. | 370/351 |
| 2007/0064715 A1* | 3/2007 | Lloyd et al. | 370/401 |
| 2008/0228940 A1* | 9/2008 | Thubert | 709/238 |
| 2009/0119484 A1* | 5/2009 | Mohl et al. | 712/201 |
| 2009/0313592 A1* | 12/2009 | Murali et al. | 716/6 |

* cited by examiner

*Primary Examiner*—Brian D Nguyen
*Assistant Examiner*—Roberta A Shand
(74) *Attorney, Agent, or Firm*—Harness, Dickey & Pierce, P.L.C.

(57) ABSTRACT

A method for establishing a routing scheme defining a path between any given pair of source node and destination node in a network including a plurality of nodes connected by links. The method comprises defining a plurality of virtual network layers, each virtual network layer comprising addresses for identifying each node, and channels for communicating between said nodes using said addresses, and defining a routing function for each layer, the routing scheme comprising all routing functions, each routing function comprising a set of source node/destination node pairs and a path connecting each pair. The routing function is defined by defining a cost function for each layer, said cost function being adapted to assign a high cost to any path creating a deadlock, using said cost function to assign a cost to each path in each layer connecting the source node/destination node pair, selecting the path with the lowest cost, and assigning the pair of source node/destination node and its selected path to the routing function of the layer that contains said selected path.

According to this aspect of the invention, the number of virtual layers is defined initially, and the routing scheme is then generated using this number of layers. This provides complete control over the number of layers, so that it is possible to adjust the number of virtual layers to the capacity of the network.

8 Claims, 4 Drawing Sheets

DEADLOCK FREE NETWORK ROUTING

FIELD OF THE INVENTION

The present invention relates generally to methods for establishing a routing scheme defining a path between any given pair of source node and destination node in a network including a plurality of nodes connected by links, and implementing such schemes in a network.

BACKGROUND OF THE INVENTION

During the last years, clusters of PCs (or Networks of Workstations, NOWs) are being considered as a cost-effective alternative to small and medium scale parallel computing systems. The performance of clusters is closely related to the advances in the interconnection network field. Currently, there are many proposals for NOW interconnects like Myrinet, Servernet II, Gigabit Ethernet, InfiniBand, and PCI Express ASI that allow to build high-performance clusters.

As the number of components in the cluster increases, the probability of faults also increases. Moreover, the components (processors, switches, and links) are often used close to their technology limits which also increases the probability of experiencing a fault—for large computer network it is more likely that one or more of the network components are broken at any time than that all of them are up and running. For some environments, like high-performance computation and web servers, it is critical to keep the system running even in the presence of faults. Therefore, automatic routing and re-routing becomes very important.

Clusters are usually arranged with switch-based networks whose topology is defined by the customer. The layout of the network can be designed by using regular or irregular topologies. However, regular topologies are often used when performance is the primary concern. Preferred topologies are multistage networks. However, in the presence of some switch or link failures, a regular network will become an irregular one. In fact, most of the interconnects available (Myrinet, Quadrics, PCI Express ASI, Ethernet) to build custom-made clusters allow the use of an irregular topology.

A common property of these networks is that packets are not allowed to be dropped in the presence of congestion. Instead, packets are buffered and flow control mechanisms are used to prevent packet dropping. For this reason, these networks are referred as lossless networks. In lossless networks mechanisms for acknowledging and retransmitting packets are not necessary, thus, lower packet latencies are achieved. The drawback of lossless networks is, however, that they are prone to deadlocks. A deadlock may occur if the routing of packages includes a cyclic dependency, i.e. when a set of three or more nodes are connected by parts of three or more paths. As a simple example, illustrated in FIG. 1, a node A has a packet destined for node B, node B has a packet destined for node C, and node C has a packet destined for node A. The three nodes are thus waiting for each other, and are in deadlock.

In order to avoid deadlocks, the efficiency of the routing may be reduced. One way to avoid deadlocks while maintaining routing efficiency, is to divide a physical network into a plurality of virtual layers. This is illustrated schematically in FIG. 2, for the case of three virtual layers. Here, each node is assigned three addresses, and each physical link contains three different channels. The channels connect the nodes using the addresses in such a way that three separate identical layers are formed. Now, a packet can be sent from node A to node B in layer L1, a packet sent from node B to node C in layer L2, and a packet sent from node C to node A in layer L3. The deadlock is avoided.

Figure 2:
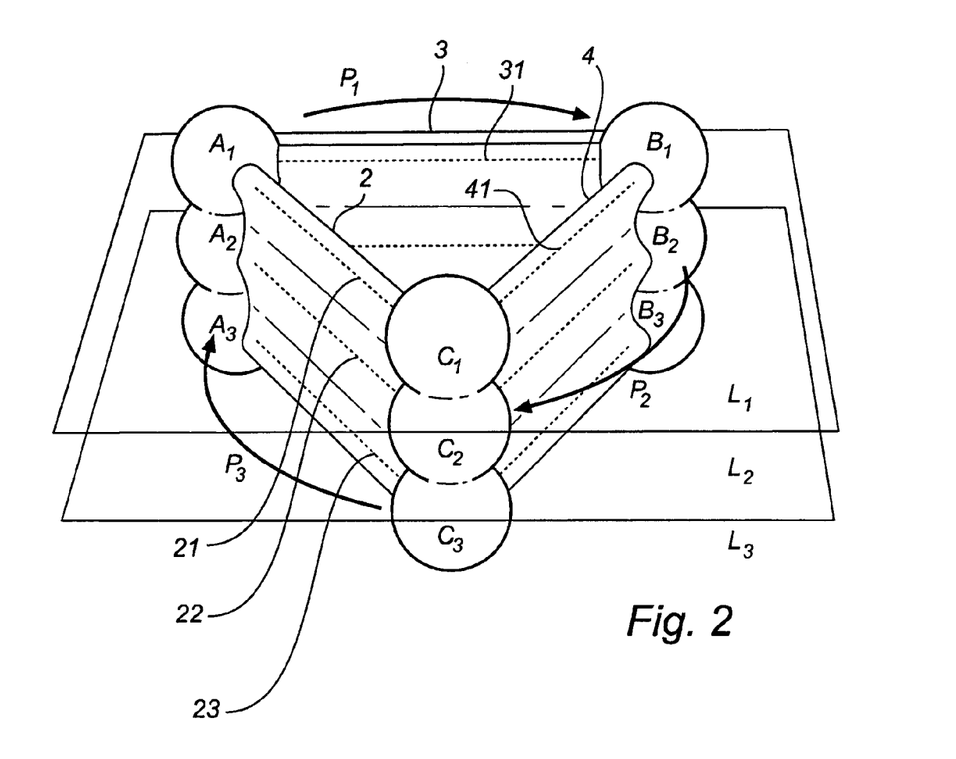
FIG. 2 schematically illustrates creating virtual layers in a network.

It is noted that in principle, for unlocking one deadlock only two virtual layers are required. However, three layers are illustrated in FIG. 2, to indicate that typically a larger number of layers are required, to avoid a large number of potential deadlocks.

Another differential aspect is the computation cost of the routings. For instance, some of the routings are focused in achieving the best set of paths taking as a reference future traffic balance. As the number of possible routing paths among the same <source, destination> pair usually grows with system size, the computation time to achieve the best set of paths (one for each <source, destination> pair) may be too excessive for some critical scenarios (large topologies and real-time systems).

Additionally, as routing algorithms require different resources from the network, they may not be well suited for different technologies. For instance, Infiniband specifications allows up to 15 virtual channels for routing purposes but real implementations may not implement virtual channels at all. This means that routings schemes based on virtual layers may not be applied in these implementations.

SUMMARY OF THE INVENTION

It is an object of the present invention to overcome problems of the conventional routing schemes, and provide an improved routing of networks.

A further object is to control the number of virtual layers required by the routing scheme.

According to a first aspect of the present invention, these objects are achieved by a method for establishing a routing scheme defining a path between any given pair of source node and destination node in a network including a plurality of nodes connected by links, said method comprising:

defining a plurality of virtual network layers, each virtual network layer comprising addresses for identifying each node, and channels for communicating between said nodes using said addresses, defining a routing function for each layer, each routing function comprising a set of source node/destination node pairs and a path connecting each pair, by repeating the following steps for each pair of source node/destination node:

defining a cost function for each layer, said cost function being adapted to assign a high cost to any path creating a deadlock, using said cost function to assign a cost to each path in each layer connecting the source node/destination node pair, selecting the path with the lowest cost, and assigning the pair of source node/destination node and its selected path to the routing function of the layer that contains said selected path.

According to this aspect of the invention, the number of virtual layers is defined initially, and the routing scheme is then generated using this number of layers. This provides complete control over the number of layers, so that it is possible to adjust the number of virtual layers to the capacity of the network.

Naturally, if the number of virtual layers is too small, there is a risk that the routing scheme may not be optimal from an efficiency point of view. However, the invention is based on the realization that it is more advantageous to have a slightly inefficient, deadlock-free routing scheme that can be implemented, than to have an optimal deadlock free routing scheme that cannot be implemented. This aspect of the invention provides just that, a deadlock free routing scheme that is as efficient as possible, given the constraints of the network.

This is made possible by using a cost function, and generating a routing scheme limited to the defined number of virtual layers, where the cost for each path is minimized. Note that the general concept of a cost function includes the simple case of assigning a zero cost or an infinite cost to each possible path. This would correspond to either allowing or prohibiting that path.

Note that it may not be necessary to redefine the cost function of each layer each time a path is assigned to a routing function. Typically, it is sufficient to redefine the cost function of the layer that contains the path most recently assigned to a routing function.

At least during the establishment of the routing scheme, the virtual layers are preferably identical. This facilitates the assignment of costs and selection of paths in the routing scheme. However, after the routing scheme is complete, it may be advantageous to reduce the virtual layers to include those channels that are actually used by the routing scheme. For example, this may reduce power consumption of the network.

A second aspect of the present invention relates to assigning a cost to each possible connection of two links in a node, i.e. each possible turn in the network. This creates new possibilities when using a cost function to avoid deadlocks when selecting paths in a routing function.

According to this aspect, a cost is thus assigned to connecting input link to output link in a node (switch). This means that for any given switch in the network, different costs can be assigned depending on which links are connected by the switch. This means that the same switch may have one cost assigned to one pair of input link/output link, and another cost assigned to another pair of input link/output link.

By associating weights with some forwarding choices in this way, it can be ensured that some choices are avoided when looking for shortest/cheapest paths. The purpose of doing this will be to avoid deadlock, or to reduce the number of needed layers in the routing methods.

This aspect may advantageously be combined with the first aspect of the present invention, but is not limited to such combination, and may also be advantageously applied in other routing algorithms.

The cost functions may consider in advance all possible deadlocks that may be caused by the next added path, and thus ensure that such a path is assigned a high cost. Alternatively, the cost function does not anticipate the next path, but this is instead evaluated subsequently. In such a case, the step of defining a routing function for each layer can comprise The step of defining a routing function may comprise:
defining a set of constraints,
defining a set of dependencies,
for each pair of source and destination,
a) determine a lowest cost path between said source and said destination complying with said set of constraints,
b) assess if said path causes a deadlock,
c) if a deadlock is caused, identify a connection of two links in a node that causes said deadlock, include said connection in said set of constraints, and return to step a),
d) if no deadlock is caused, add any dependencies created by said path to said set of dependencies, and proceed with the next pair of source and destination.

According to this embodiment, the lowest cost path may thus be found to cause a deadlock. If this is the case, this path is rejected, and the turn, i.e. the connection of an input port to an output port in a switch, that is made by this path and that closes a cycle to cause a deadlock, is identified. This connection (turn) is prohibited by adding it to the set of constraints (possibly by giving it a very high cost according to the second aspect of the invention mentioned above). Then another iteration is made to find a shortest path for the source-destination pair based on the new set of constraints. It will always be possible to place every source destination pair into one layer under given constraints.

According to this embodiment, the process of avoiding deadlocks is thus still achieved using a cost function, but the assignment of costs is divided in two parts, a first part without considering a possible deadlock caused by the selected path, and a second part where any such deadlock is considered.

The pairs of source and destination can be considered in the following order: select one node, consider all pairs of source and destination where the chosen node is either the source or destination, and consider all other paths in any order. This procedure makes the process even more efficient.

According to one embodiment, the routing scheme further includes transitions between layers, for connecting a first path in a first layer to a second path in a second payer, to form an aggregated path extending in two layers. If it is no longer possible to find a deadlock-free path between a given source/destination pair in any single layer, an aggregate path, extending in several layers, may thus be defined to connect these nodes.

In this case, it may be advantageous to define an aggregate cost function, including a cost associated with each possible transition between different layers.

The method for establishing a routing scheme according to the first aspect of the invention may advantageously be implemented in an Infiniband network by the following steps:

ensuring that each destination has at least N addresses (LIDs) using the Infiniband LID Mask Control (LMC)

assigning LIDs to layers in the routing scheme such that for each destination D, the LIDs of this destination are assigned uniquely to each virtual layer in the routing scheme for each destination D in each virtual layer L, establishing routing tables in each node such that the LID associated with the combination of L and D follow the network path given by the routing scheme, injecting the packet into layer L, and routing the packet from its source S to its destination D on layer L by using the LID that is unique to the combination of L and D This provides an efficient method for routing a packet from a source S to a destination D in an infiniband network The routed packet preferably has an SL that identifies the layer L it is injected into.

BRIEF DESCRIPTION OF THE DRAWINGS

This and other aspects of the present invention will now be described in more detail, with reference to the appended drawings showing a currently preferred embodiment of the invention.

DETAILED DESCRIPTION

In the following description, the following terminology is used, explained with reference to FIG. 2.

A network 1 comprises a plurality of nodes A, B, C, connected by physical links 2, 3, 4. A path P is a chain of links between a source node S and a destination node D.

Each physical link 2 may contain several channels 21, 22, 23, where each channel provides communication between two nodes A, B. The physical network can then be divided into (virtual) layers L1, L2, L3, where each virtual layer comprises a set of channels 21, 31, 41 providing the same connectivity as the physical links 2, 3, 4. A node A may further have several (virtual) addresses A1, A2, A3, so that there may be one set of addresses for each virtual layer L1, L2, L3.

A routing scheme defines a set of paths between any given pair of source node S and destination node D in a network, and a routing algorithm is used to determine a routing scheme. Based on a routing scheme, each node (switch) can be given rules for routing packets transmitted on the network, to ensure they follow the routing scheme.

Figure 3:
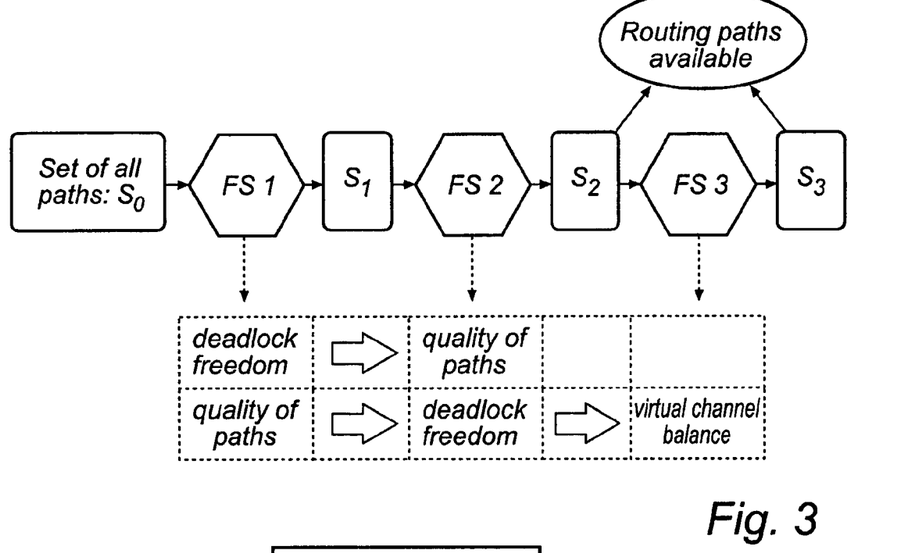
FIG. 3 shows a framework for categorizing approaches for establishing routing schemes.

FIG. 3 shows a framework for categorizing approaches for establishing routing schemes, based on functional/algorithmic pillars. FIG. 3 consists of two parts:

The upper part (solid format) defines three functional steps (FSi). Each step produces a new (smaller) set of paths $s_i$ (e.g. selecting a single deterministic path among several candidate paths according to some quality criterion) or ascribing new properties to the set of paths $s_{i-1}$ being the input to FSi (e.g. ensuring that the paths made available by the previous step are made deadlock free by the current step). Note that so defines the set of all the possible paths (minimal and non-minimal) between each <source, destination> pair assumed to be the input of any generic routing method.

Figure 1:
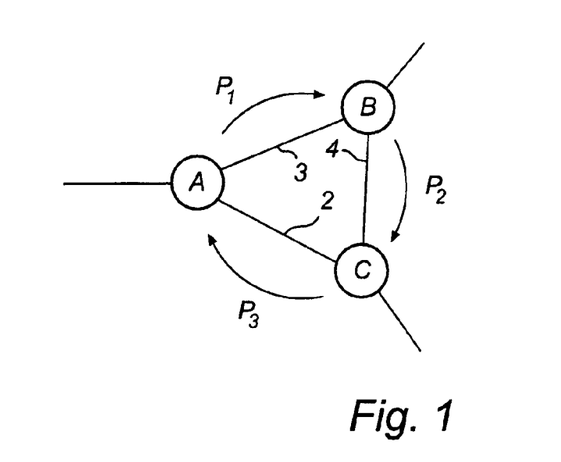
FIG. 1 schematically illustrates a deadlock situation.

The lower part (dashed format) of FIG. 3 sketches three alternative ways of realizing the referred functional steps (rule-driven, path-driven and iteration-driven) defining three different categories of routing algorithms. Moreover, each of the functional steps may be approached in various ways and in that respect distinct generic routing algorithms possessing different characteristics can be devised. FIG. 1 lists some routing functions and shows their algorithmic membership.

Guaranteeing freedom from deadlocks and obtaining a good traffic balancing (quality of the paths) are seen as the all-important issues of generic routing algorithms. Those particular tasks can be managed at different levels depending on whether virtual channels are available or not and so forth (refer also the taxonomy section). From that point of view the methodology is formulated flexible so that different deadlock avoidance strategies can be adopted. As shown in FIG. 1 the deadlock problem can be handled either in FS1 (rule-driven routings) or FS2 (path-driven routings).

The first approach followed in the framework corresponds to a class of routings that guarantee deadlock freedom in the first step FS1. Therefore, such routing algorithms impose some general routing rules that guarantee deadlock freedom. Such strategies are referred to as a rule-driven approach. The set of routing algorithms belonging to this class are UD, DFS, LTURN, SR, MUD, and FX.

Recently, new interconnect technologies, as for example InfiniBand and Advanced Switching, have been introduced, that offer virtual channels for the purpose of achieving deadlock free routing. In this context new routing algorithms have been proposed that are able to guarantee minimal-path routing requiring a modest number of virtual channels. These methods fall into the category called path-driven algorithms.

For path-driven algorithms, the objective of the first step (FS1) is to select one single path or even several paths between each <source, destination> pair, while the purpose of the second step (FS2) is to obtain deadlock free routing by means of breaking any cyclic dependencies in the channel dependency graph. All path-driven methodologies rely on the use of virtual channels for guaranteeing deadlock free routing. Three different path-driven algorithms will be described below.

The TOR (Transition Oriented Routing) methodology as proposed in *Effective methodology for deadlock-free minimal routing in InfiniBand networks*, J. C. Sancho, A. Robles, J. Flich, P. Lopez, and J. Duato, International Conference on Parallel Processing, pages 409-418, Vancouver, British Columbia, Canada, 18-21 Aug. 2002, guarantees minimal routing requiring only a modest number of virtual channels. To do this, it is essential to have all minimal paths available when conducting deadlock freedom, and in FS1 the TOR algorithm computes all minimal paths and forwards them as input to the deadlock freedom step (FS2).

Is FS2, the TOR algorithm relates the problem of breaking cyclic path dependencies to an Up/Down (UD) spanning tree of the network. UD routing avoids cycles by restricting packets from traversing a link in the up-direction after having traversed a link in the down-direction. In other words, down-up transitions are forbidden in this regime, considered as prohibited turns.

Each time a path includes a forbidden down-up turn, the algorithm instead introduces a transition to the next virtual layer. In the following, it is assumed that the virtual layers are numerically ordered (1-n, where n is the number of virtual layers). A packet that is inserted into the network through virtual layer $L_1$ will continue being routed through $L_1$ until the first forbidden transition has to be crossed. Then, the packet will be routed on $L_2$. If the packet does not have to introduce more forbidden turns, it will be routed on this virtual layer until it reaches the destination. Otherwise, the packet would have to make a transition to $L_3$, and so forth. Freedom from deadlocks follows since there are no cyclic dependencies between the virtual layers (the transitions are always upward) and there is no conflict with respect to up/down turns on each of virtual layers.

Notice that it is the path crossing the highest number of forbidden transitions which will determine the needed number of virtual layers to guarantee minimal routing. In order to use as few virtual layers as possible the TOR algorithm in FS2 considers all the minimal paths forwarded from FS1 and then selects those paths that minimizes the number of forbidden transitions.

Note that after this selection process some pair of nodes may still have more than one single path (all of them being deadlock free). Therefore, the TOR method also has to perform a single path selection as a succeeding stage (this issue is not shown as a separate step in FIG. 1).

The LASH and LASH-TOR methodologies (*Layered shortest path* (*LASH*) *routing in irregular system area networks*, T. Skeie, O. Lysne, and I. Theiss, International Parallel and Distributed Processing Symposium (IPDPS), Ft. Lauderdale, Fla., USA, Apr. 15-19, 2002), *LASHTOR: A generic transition-oriented routing algorithm*, Tor Skeie, Olav Lysne, J. Flich, P. Lopez, A. Robles, and J. Duato, In Proceedings of the Eleventh Intern. Conforence on Parallel and Distributed Systems (ICPADS 04), pages 595-604) in the first step (FS1)

only forward a single path to the succeeding deadlock freedom step (FS2). Since one single path will be passed on, the quality of this path has to be assessed—i.e. traffic balancing should be advocated at this point. LASH and LASH-TOR manage this issue by first computing all the minimal paths, similar to the TOR algorithm, and then selecting one single path among the candidates.

In the deadlock eliminating step (FS2) LASH takes a different approach for breaking cyclic path dependencies. The idea behind LASH is that each virtual layer L in the network has a set of <source, destination> pairs assigned to it, in such a way that all <source, destination> pairs are assigned to exactly one virtual layer. This means that the packets (associated with a pair of nodes) will be routed in one virtual layer from source to destination, thus defining strictly layered routing. The process of assigning paths to the virtual layers is conducted in the way that each virtual layer is deadlock free by ensuring that the channel dependencies stemming from the <source, destination> pairs of one layer do not generate cycles. The LASH algorithm takes one <source, destination> pair at time that has not yet been assigned to a virtual layer, and finds an existing virtual layer L (by first considering $L_0$, then $L_1$, and so forth) such that the <source, destination> path can be added without closing a cycle. If the previous step was unsuccessful, a new virtual layer will be created (reserved for deadlock free routing) and the <source, destination> pair assigned to this virtual layer. Since no packets are allowed to switch between virtual layers, and from the fact that each virtual layer is deadlock free (by consulting that the channel dependency graphs are cycle free) the resulting routing function is also deadlock free. The need for virtual layers in order to guarantee minimal routing follows a logarithmic curve as the size of the network grows. However, LASH demands more virtual layers than the TOR algorithm to ensure minimal routing.

The LASH-TOR methodology is, as the name indicates, an extension of LASH for the purpose of reducing the number required virtual layers. This is achieved by allowing transitions between the layers. Similar to LASH, LASH-TOR assigns <source, destination> pairs (paths) onto virtual layers, by consulting that the path under assignment does not introduce cycles. However, as in transition-oriented routing, a path can be split into several subpaths each of them being assigned to different virtual layers. In particular, a path will be split at the point (switch) where the next dependency associated with this path would introduce a cycle in the dependency graph of the inspected virtual layer $L_i$. A transition will then be made to virtual layer $L_{i+1}$, where the (sub) path continues until it is completely assigned or else has to make a transition to virtual layer $L_{i+2}$, and so forth. Moreover, a path might be spread across several virtual layers, however, note that it may also be completely assigned to only one virtual layer ($L_1$).

It is shown that LASH-TOR requires significant fewer virtual layers than LASH as the network size grows and have comparable figures to the TOR methodology. On the other hand LASH possesses the strength of strictly layered routing avoiding the transition-oriented routing problem that congestion in a virtual layer may affect other virtual layers. Besides, note that common for LASH and LASH-TOR is that they conduct (physical) traffic balancing in functional step 1, completely detaching the issue of selecting a single deterministic path from the issue guaranteeing deadlock freedom. This is opposed to the TOR algorithm, where the single path selection (traffic balancing issue) succeeds the deadlock freedom task, as elaborated above.

For the purpose of using as few virtual layers as possible to guarantee deadlock freedom, all the path-driven algorithms in FS2 assign as many <source, destination> pairs as possible onto the lowest numbered virtual layers. That means that $L_1$ will be the most filled virtual layer, $L_2$ the second most filled one etc., and $L_n$ may only contain very few (sub)paths. This could result in poor utilization of the network resources. The objective of the third step (FS3) is therefore to balance the virtual channel resources required for breaking cyclic dependencies in FS2. (Traffic balancing with respect to the physical link resources was conducted in the previous steps.)

For the TOR and LASH-TOR methodologies, the typical situation is that most of the paths assigned to virtual layer $L_1$ are complete paths. As an example, the TOR algorithm will assign completely about 75% of the paths of a 32 switch network to $L_1$ (moreover, those paths do not impose forbidden transitions at all). Thus, the TOR algorithm performs virtual balancing by moving completely routed $L_1$ paths to the virtual layers $L_2 \ldots L_n$ until a balancing criteria is met. Since those candidate paths do not introduce any forbidden down-up turns (note that each virtual layer refer to the same UD tree) regardless of which virtual layer they are routed in, freedom from deadlocks follows. LASH-TOR approaches the virtual balancing task similarly, the paths completely assigned to $L_1$ are moved to the other layers until a quality criteria is met. In this process, LASH-TOR would have to consult that the channel dependency graphs of the layers $L_2 \ldots L_n$ still are free from cycles.

LASH works similarly to LASHTOR, however, there is one distinction. Since the former methodology is strictly layered, all the paths in $L_1$ (or any of the other virtual layers for that matter) are candidates for the move-process.

Figure 4:
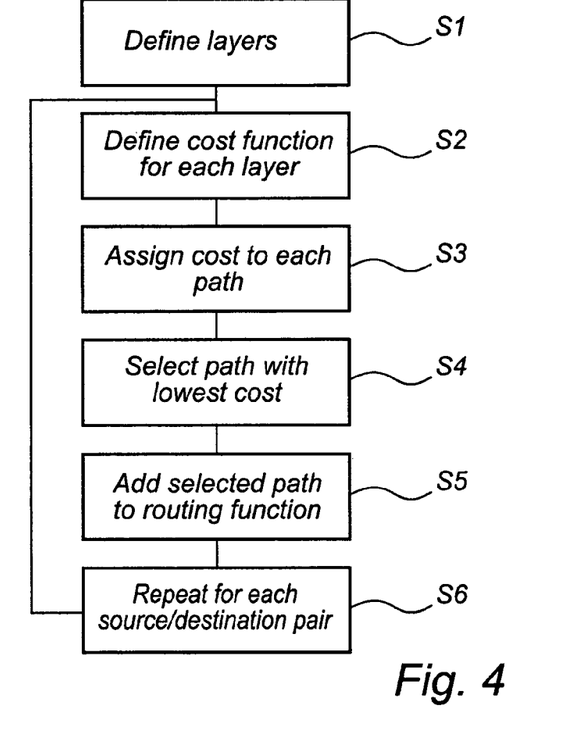
FIG. 4 shows a flow chart of a routing algorithm according to a first embodiment of the present invention.

According to an embodiment of the present invention, a routing scheme is established according to the routing algorithm illustrated in FIG. 4.

First, in step 1, a plurality of virtual layers are defined. Note that this is a significant difference compared to e.g. LASH described above, where the number of layers is decided by the routing algorithm. According to this embodiment of the invention, the number of layers is decided first, and the routing algorithm then has to adjust to this restricted number of layers.

In step 2-5, a set of routing functions is defined, one routing function for each virtual layer. This includes defining a cost function for each virtual layer (step 2), using the cost function to assign a cost to each possible path between source S and destination D in the pair (step 3), and selecting he path with the lowest cost (step 4). In step 4, any of the many well known algorithms for finding shortest paths can be used (e.g. Dijkstras Shortest Path algorithm). The selected path is then added to the routing function for the layer that contains this path (step 5).

The steps 2-5 are then repeated for each possible pair of source node S and destination node D in the network (step 6). Note that each time step 2 is performed, a new path has been added to a routing function of one of the layers. This means that this layer now may contain additional risks for deadlocks, leading to a different cost function in step 2 than the previous time. As the next source/destination pair is always allocated to the layer where the lowest cost path can be found, the paths will be distributed among the layers in an optimal way.

According to an embodiment of the present invention, the cost function in step 2 includes a cost assigned to each turn, i.e. each connection from one link to another in a node (switch). Note that for any given switch in the network, different costs can be assigned to different turns. This means that the same switch may have one cost assigned to one pair of input link/output link, and another cost assigned to another pair of input link/output link.

Assigning costs to turns is beneficial in the context of the embodiment illustrated in FIG. 4, but may also be very beneficial when avoiding deadlocks in other routing algorithms. For example, in a layer in LASH it is possible to identify the turns that can not be taken by any path in this layer. By assigning a high cost to this turn, this turn will be avoided in the search for shortest/cheapest pats. Another example is in LASHTOR, where the turns that cause transitions can be identified, and given a high cost. In the search for shortest/cheapest paths this turn will be avoided.

Figure 5:
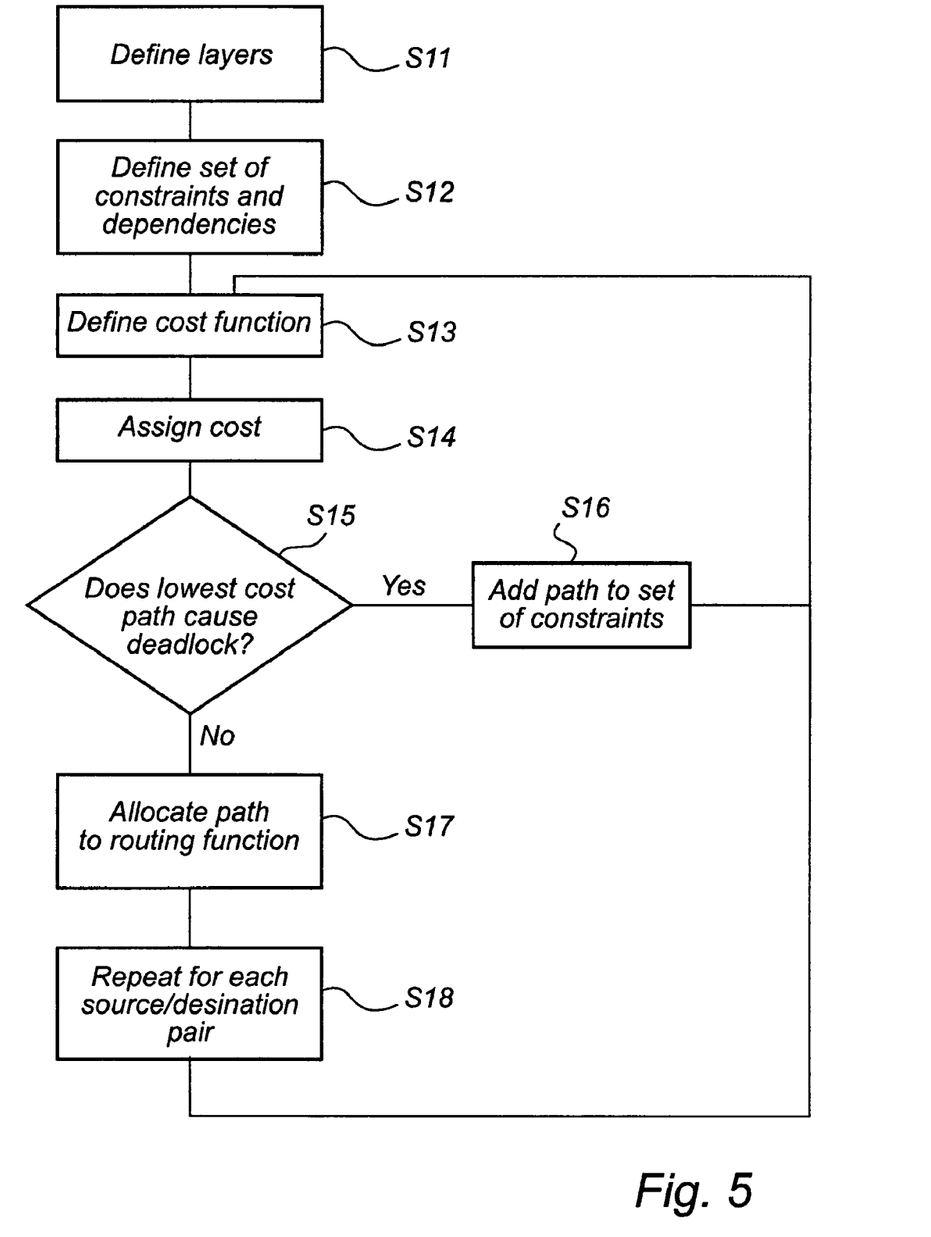
FIG. 5 shows a flow chart of a routing algorithm according to a second embodiment of the present invention.

An alternative embodiment of the invention is illustrated in FIG. 5. According to this embodiment, first a plurality of virtual layers are defined in step 11. Then, a set of constraints and a set of dependencies are defined in step 12.

Step 13-14 corresponds to steps 2-3 in FIG. 4. However, in this case, the lowest cost path is not necessarily selected. Instead, in step 15, it is determined if this path causes a deadlock.

If this is the case, in step 16 this path is rejected, and the turn causing the deadlock is identified and added to the set of constraints. The set of constraints may be implemented in the cost function, for example as suggested above by assigning a very high cost to the prohibited turn. Then, the program control returns to step 13, and recalculates the lowest cost path.

If, on the other hand, the lowest cost path does not cause a deadlock, in step 17 it is allocated to a routing function, and any dependencies created by said path is added to the set of dependencies. By iterating in this fashion, all deadlocks are avoided (as far as possible within the defined number of layers).

In some situations there may be a risk that there is no valid path between a source and destination that will not close a cycle of dependencies, and thereby cause deadlock. This risk can be minimized by considering <source, destination> pairs in careful order. According to an embodiment of the present invention, one way of doing this is to start by choosing one node N in the network, then adding all dependencies from all input ports to all output ports of N, and finally considering all <source, destination> pairs having N as either source or destination before considering all other pairs.

The method above can be extended to several layers in the obvious way. This could (but need not) make all layers fully connected, and one would have full control over which layer every packet should be injected into. In particular one could choose to inject the packets into layers where the source destination pair in question got the shortest paths.

The routing scheme established by an embodiment of the present invention, as well as several conventional routing schemes, require that each layer has a separate routing function. This means that a packet heading for a given destination will take different paths depending on which layer it is injected into. In Infiniband this is a problem, as routing decisions in the switches is done on based on destination address only, and not based on service level or which virtual channel the packet resides in. This problem can be circumvented by implementing a routing scheme according to the process in FIG. 6, for routing a packet from a source node to a destination node.

Figure 6:
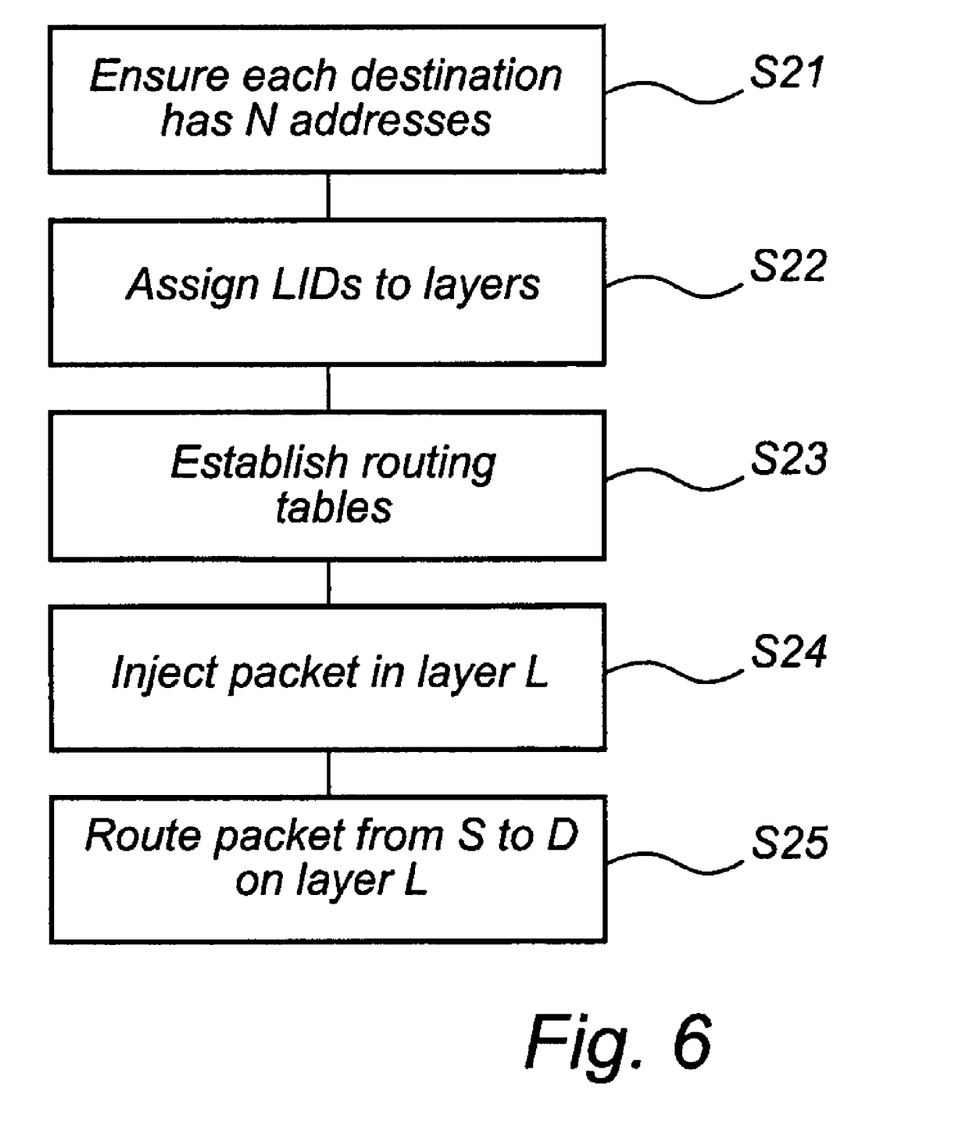
FIG. 6 shows a flow chart of a method for routing a packet through an Infiniband network, according to a third embodiment of the present invention.

First, in step 21, it is ensured that each destination has at least N addresses (LIDs) using the Infiniband LID Mask Control (LMC). Then, in step 22, LIDs are assigned to layers in the routing scheme such that for each destination D, the LIDs of this destination are assigned uniquely to each virtual layer in the routing scheme. In step 23, for each destination D in each virtual layer L, routing tables in each node are established such that the LID associated with the combination of L and D follow the network path given by the routing scheme. Then, in step 24, the packet is injected into layer L, and finally, in step 25, the packet is routed from its source S to its destination D on layer L by using the LID that is unique to the combination of L and D In an Infiniband network, each switch has a mapping from a service level (SL) to a virtual level (VL). In order for the above implementation to work effectively, the SL to VL mapping tables in the switches must be set accordingly, for the packet to follow the correct layer. In most cases this will mean that the SL to VL mapping should be identical in all switches.

The person skilled in the art realizes that the present invention by no means is limited to the preferred embodiments described above. On the contrary, many modifications and variations are possible within the scope of the appended claims. For example, it may be advantageous to use a well known routing algorithm in the fault free case, and use methods according to the present invention only for paths affected by faults.

The invention claimed is:

1. A method for establishing a routing scheme defining a path between any given pair of source node and destination node in a network including a plurality of nodes connected by links, said method comprising:
  defining a plurality of virtual network layers in the network, each virtual network layer including addresses for identifying each node, and channels for communicating between said nodes using said addresses,
  defining a routing function for each layer in the network, said routing scheme including all routing functions, each routing function having a set of source node/destination node pairs and a path connecting each pair, by repeating the following steps for each pair of source node/destination node:
  defining a cost function for each layer, said cost function being adapted to assign a high cost to any path creating a deadlock,
  using said cost function to assign a cost to each path in each layer connecting the source node/destination node pair,
  selecting the path with the lowest cost, and
  assigning the pair of source node/destination node and the selected path to the routing function of the layer that contains said selected path,
  wherein defining a routine function further comprises:
    defining a set of constraints,
    defining a set of dependencies,
    for each pair of source and destination,
    a) determine a lowest cost path between said source and said destination complying with said set of constraints,
    b) determine if said path causes a deadlock,
    c) if a deadlock is caused, identify a connection of two links in a node that causes said deadlock, include said connection in said set of constraints, and return to step a),
    d) if no deadlock is caused, add any dependencies created by said path to said set of dependencies, and proceed with the next pair of source and destination.

2. The method according to claim 1, wherein said virtual network layers are identical.

3. The method according to claim 1, wherein said cost function assigned to each layer comprises a cost associated with each possible connection of two links in a node.

4. The method according to claim 1, wherein the pairs of source and destination are considered in the following order:
- select one node,
- consider all pairs of source and destination where the chosen node is either the source or destination, and
- consider all other paths in any order.

5. The method according to claim 1, wherein said routing scheme further includes transitions between layers, for connecting a first path in a first layer to a second path in a second payer, to form an aggregated path extending in two or more layers.

6. The method according to claim 5, further comprising defining an aggregate cost function, including a cost associated with each possible transition between layers.

7. A method for routing a packet from a source S to a destination D in an infiniband network, comprising:
- establishing a routing scheme according to claim 1, said routing scheme requiring a number N of virtual layers,
- ensuring that each destination has at least N addresses (LIDs) using the Infiniband LID Mask Control (LMC),
- assigning the LIDs to layers in the routing scheme such that for each destination D, the LIDs of this destination are assigned uniquely to each virtual layer in the routing scheme,
- for each destination D in each virtual layer L, establishing routing tables in each node such that the LID associated with the combination of L and D follow the network path given by the routing scheme,
- injecting the packet into layer L, and
- routing the packet from its source S to its destination D on layer L by using the LID that is unique to the combination of L and D.

8. The method according to claim 7, wherein the routed packet has a service level (SL) that identifies the layer L it is injected therein.

* * * * *